United States Patent [19]

Lengefeld

[11] Patent Number: 4,837,704
[45] Date of Patent: Jun. 6, 1989

[54] COMPUTER CONTROLLED MATERIAL HANDLING

[75] Inventor: Wendell L. Lengefeld, Round Rock, Tex.

[73] Assignee: International Business Machines Corporation, Armonk, N.Y.

[21] Appl. No.: 227,446

[22] Filed: Jul. 29, 1988

Related U.S. Application Data

[63] Continuation of Ser. No. 905,433, Sep. 10, 1986, abandoned.

[51] Int. Cl.⁴ .............................................. G06F 15/46
[52] U.S. Cl. ..................................... 364/478; 364/132; 364/200; 364/474.11
[58] Field of Search ............... 364/478, 468, 131, 132, 364/138, 474.11, 200, 900; 340/825.08, 825.12, 823.23, 680

[56] References Cited

U.S. PATENT DOCUMENTS

| | | | |
|---|---|---|---|
| 3,747,074 | 7/1973 | Schulze | 340/200 |
| 3,775,751 | 11/1973 | Anderson | 340/200 |
| 4,053,741 | 10/1977 | Aimoya et al. | 364/478 |
| 4,100,533 | 7/1978 | Napolintano et al. | 340/825.08 |
| 4,251,858 | 2/1981 | Cambigue et al. | 364/200 |
| 4,281,315 | 7/1981 | Bauer et al. | 340/825.08 |
| 4,306,292 | 12/1981 | Head, III | 364/468 |

Primary Examiner—Allen MacDonald
Attorney, Agent, or Firm—Andrea P. Bryant

[57] ABSTRACT

Apparatus and a method are disclosed for use in a computer controlled factory environment which includes workstations and automated vehicles servicing those workstations for monitoring the status of a plurality of system devices and reporting same, on demand, to the control computer in a predetermined sequence manner which minimizes control computer involvement in polling and buffering operations and optimizes vehicle movement.

4 Claims, 21 Drawing Sheets

COMPUTER CONTROLLED MATERIAL HANDLING

This is a continuation of application Ser. No. 905,433, filed Sept. 10, 1986, abandoned.

DESCRIPTION

1. Technical Field

The present invention relates to computer controlled material handling systems as used in factory automation. More particularly, it relates monitoring and handling the many input and output signals distributed throughout a system comprised of a variety of material handling devices and plurality of workstations which signals are indicative of workstation status.

2. Background Art

It is known to use direct computer I/O to provide a solution to the problem of monitoring a great plurality of I/O signals generated in a highly mechanized manufacturing operataion. The disadvantage to such a system is that the control computer must have great I/O capability and must poll all inputs and outputs. Additionally, much cabling is needed to make the connections.

U.S. Pat. No. 4,306,292 describes the segmented asynchronous operation of a automated assembly line including a control computer in communication with a plurality of worker computers which are not automatically polled as in the present invention.

U.S. Pat. No. 4,100,533 discloses a multi-point polling technique which relieves the control computer of some polling overhead, but does require that it transmit an address list for polling periodically.

U.S. Pat. Nos. 3,747,074 and 3,775,751 relate to methods of apparatus for baud rate detection involving special circuitry to process data transmission and determine the baud rate by timing the transmission times.

DISCLOSURE OF THE INVENTION

In highly automated manufacturing installations including many workstations at which the same or differing operations are performed, remotely guided vehicles are used to transport work in progress to the workstations. The path of the vehicle, work in progress route, changes as a result of several factors, not the least of which is the condition or status of a workstation. Such conditions include whether the workstation is operative and available to receive and process work. It is desirable to optimize vehicle path length to transport work to workstations so that non-productive time is minimized and system throughput is increased.

The present invention provides automatic polling of input and output signals distributed throughout an automated material handling system by automatically polling and storing workstation status data from a plurality of Remote Station Controllers RSCs, in communication with the workstations. The data is transmitted to a Control Interface Unit CIU which provides the data to the control computer on demand. The CIU resumes polling while the control computer processes the data. Since all polling and buffering is done by the CIU; the control computer is relieved of time consuming polling and data request operations leading to more efficient throughput and minimized down time of the factory installation. Further, the manner in which workstation status data is transferred to the control computer enhances the control of vehicle movement among the workstations.

BRIEF DESCRIPTION OF THE DRAWING

For better understanding of the present invention together with other and further advantages and features thereof, reference is made to following description taken into connection with the accompanying drawing in which.

BEST MODE FOR CARRYING OUT THE INVENTION

In a highly automated multi-step manufacturing/assembly process, many material handling devices such as vertical storage systems, conveyor systems, transport, guided vehicles and the like are involved. Such a process includes controlling material flow through complex processes at many stations. A computer for controlling such a system must continuously monitor and control many I/O signals for successful process operation with minimum down time and maximum throughput.

Monitoring of the various I/O signals is typically performed via switches, photocells, and controls by using relays or LEDS. Information transmitted via these signals triggers process control decisions and material move transactions. The reliability of these information signals is therefore of critical importance.

Such automated manufacturing or assembly installations cover many square feet involving large distances between individual workstations. It is desirable that the control system be extremely reliable, easily maintainable and efficient.

Figure 1:
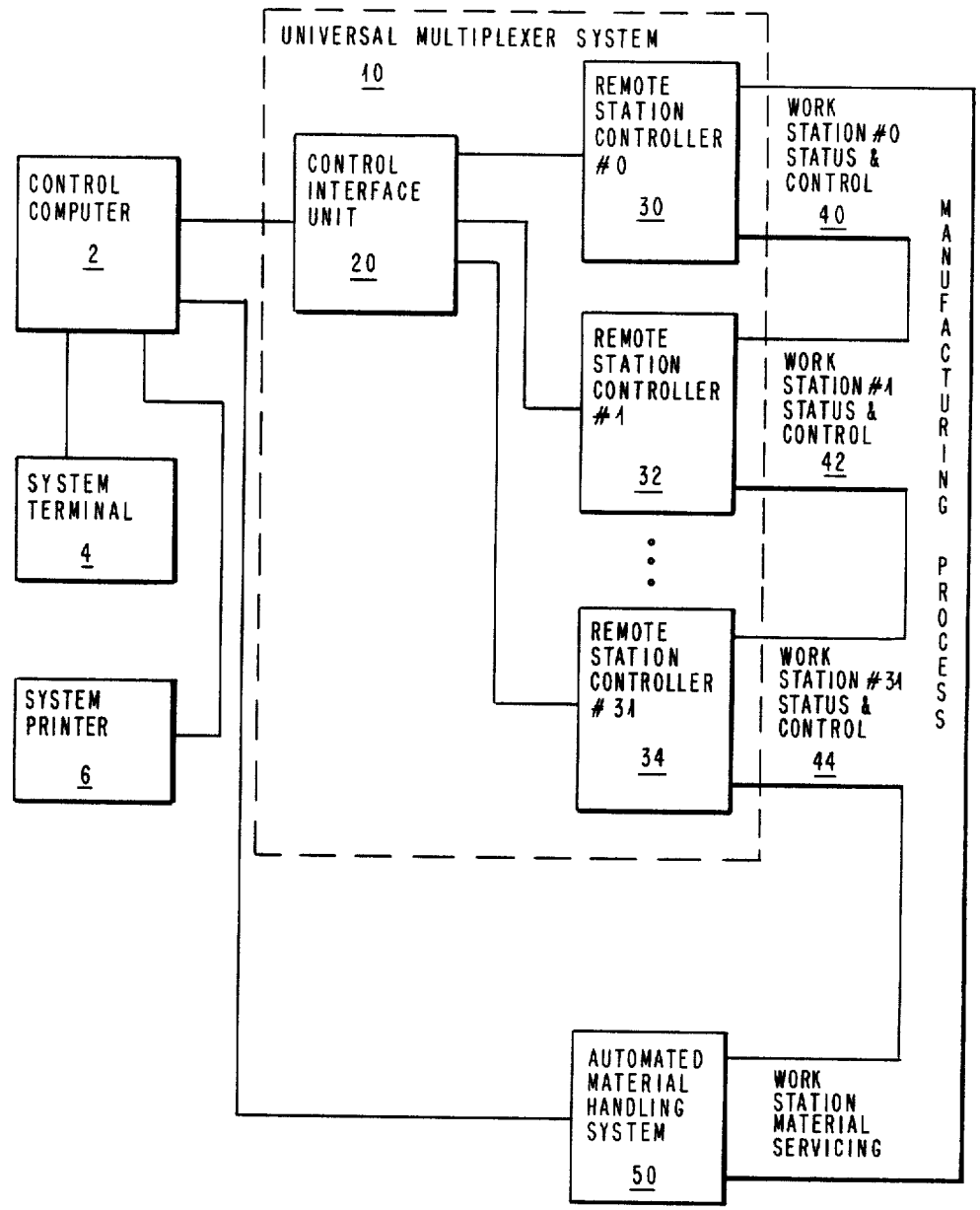
FIG. 1 is a schematic block diagram of a control system for an automated manufacturing process.

FIG. 1 shows control computer 2 connected to the universal multiplexer system UMS 10 of the present invention. UMS 10 is a microprocessor controlled modular system for automatically determining the status of input devices and reporting that information, on demand, to control computer 2. Operator communication to control computer 2 occurs via system components, terminal 4 and printer 6. Control computer 2 is connected directly to the Control Interface Unit CIU 20 of the present invention which in turn communicates with up to 32 Remote Station Controllers RSCs illustrated at 30, 32 and 34.

Each RSC 30, 32 and 34 can support up to 32 input and 16 output lines where the communication is to a plurality of various workstations, represented at 40, 42, and 44, in the manufacturing installation. Control computer 2 is also in communication with an automated material handling system control 50, which also interacts with workstations 40, 42 and 44.

Figure 2:
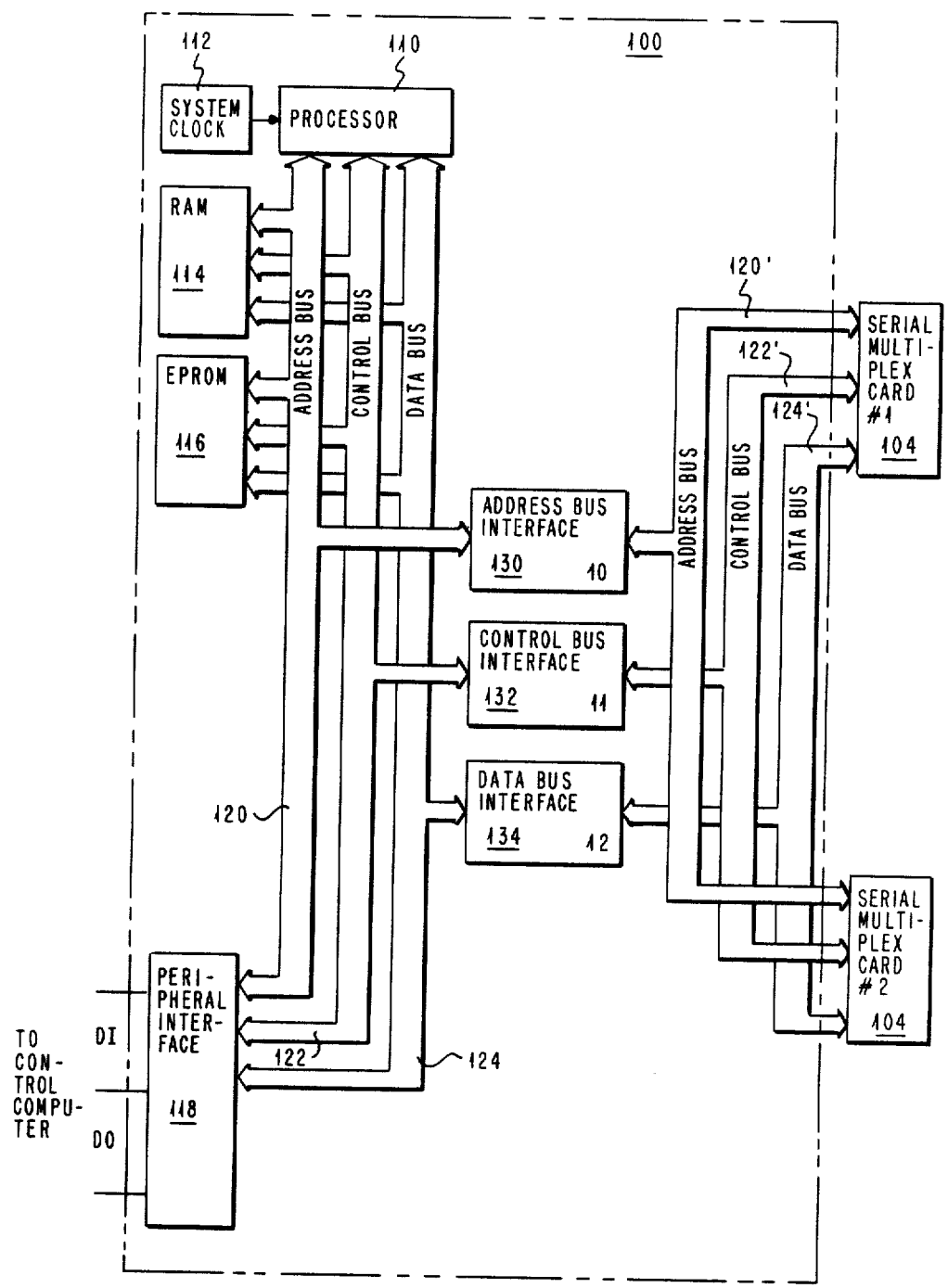
FIG. 2 is a block diagram of CIU 20.

Refer now to FIG. 2, a block diagram of CIU 20. CIU 20 hardware includes a processor card, a mother board, two serial multiplex cards 104, and a power supply. A processor 110 is provided for controlling UMS 10 in FIG. 1. Processor 110 is driven by system clock 112 to process and store data in memory 114, which may be a random access device. Programs for driving CIU 20 are stored in memory device 116.

A programmable peripheral interface 118 is used to provide the data link to control computer 2, FIG. 1, and consists of 16 Digital Input (DI) lines and 16 Digital Output (DO) and data synchronization signals.

Figure 3:
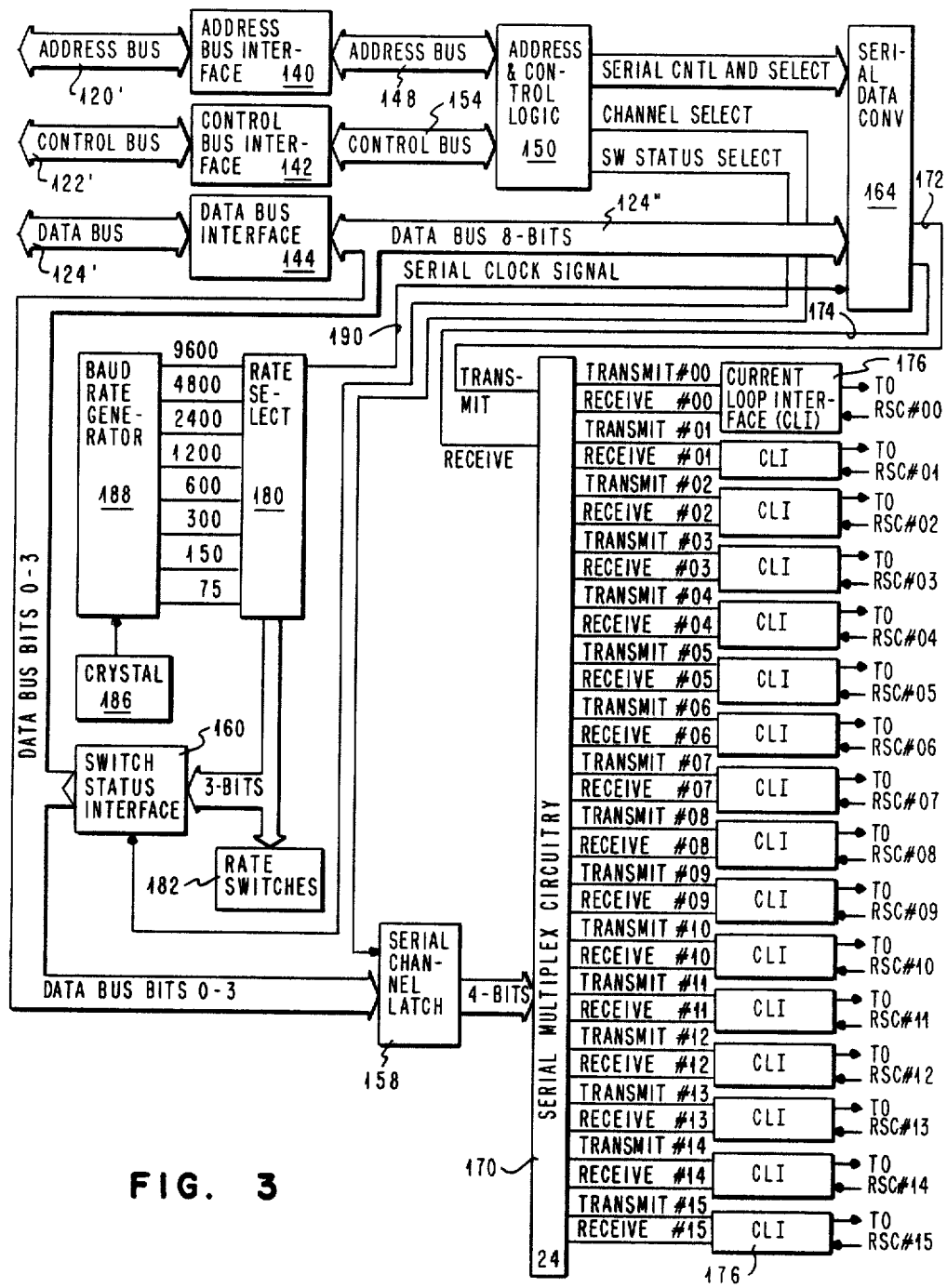
FIG. 3 is a block diagram of a serial multiplex card 104 in FIG. 2.

Data and program information are transferred via address bus 120, control bus 122 and data bus 124. Address bus 120 provides address information and control bus 122 provides clock signals, read/write signals and the like. Data bus 124 is a bidirectional bus for program and data information. Processor 110 is connected to two serial multiplex cards 104 by address, control and data bus signals on buses 120, 122 and 124, respectively. These signals are buffered by an address bus interface 130, control bus interface 132 and data bus interface 134, respectively. The two serial multiplex cards 104 are essentially the same so only one will be described in connection with FIG. 3. The first serial multiplex card 104 deals with the first 16 of the 32 possible RSCs while the second serial multiplex card cooperates with the other 16 of the 32 possible RSCs. Refer now to FIG. 3, which shows a block diagram of one of the serial multiplex cards 104 included in CIU 20. Address, control and data buses 120', 122'and 124', respectively from bus interface devices 130, 132 and 134 (FIG. 2) are input to address bus interface 140, control bus interface 142 and data bus interface 144. Address bus 148 connects address bus interface 140 to address and control logic 150. Similarly, control bus 154 connects control bus interface 142 and address and control logic 150.

Address and control logic 150 is provided for interpreting address and control information in order to select either the serial channel latch 158, switch status interface 160 or serial data converter 164. When serial channel latch 158 is selected, it accepts a new channel address from the data bus for connecting serial data converter 164 to one of the RSCs by means of serial multiplex circuitry 170.

Serial multiplex circuitry 170 connects transmit and receive signals 172 and 174 from serial data converter 164 to one of the 16 RSCs served by this serial multiplex card 104. In this preferred embodiment 16 current loop interfaces CLIs 176 are provided to convert serial data so that it can be reliably transferred between the RSCs and CIU 20 over the large distances involved in a factory environment.

A switch status interface 160 enables the status of the rate switches 182 to be read by processor 110. Rate switches 182 determine the serial communication rate to be gated by rate select logic 180 to the serial data converter 164. A clock crystal 186 and baud rate generator 188 are used to generate communication rates ranging from 9600 baud to 75 baud. Serial data converter 164 utilizes the selected serial clock signal on line 190 to transmit and receive serial data to and from the selected RSC. Parallel data from the processor is converted by serial data converter 164 to serial data and transmitted to the selected RSC. When the RSC's response is received by serial data converter 164 the data is converted to parallel and transferred back to processor 110.

Figure 4:
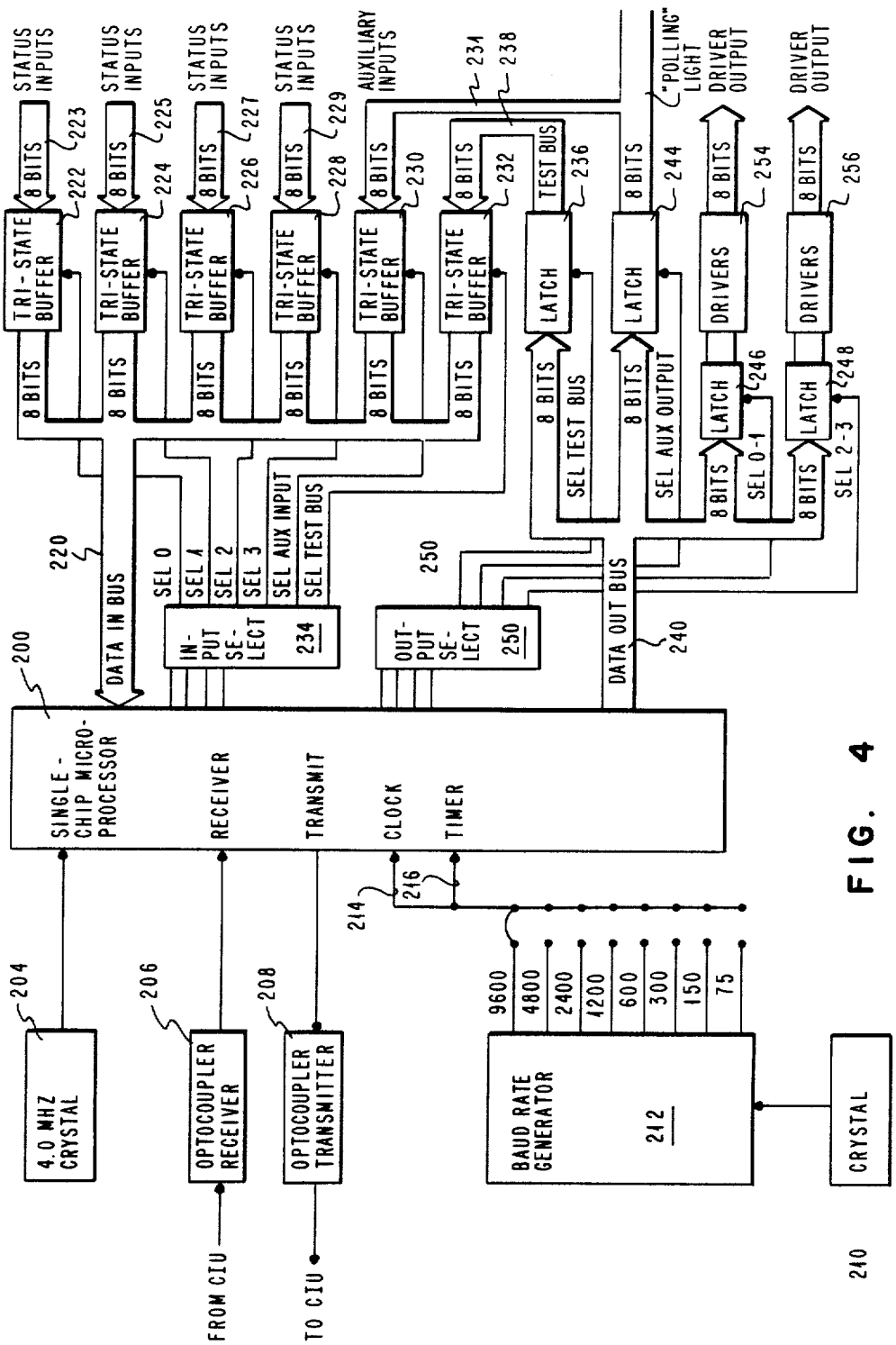
FIG. 4 is a block diagram of one RSC 30 FIG. 1.
Figure 5A:
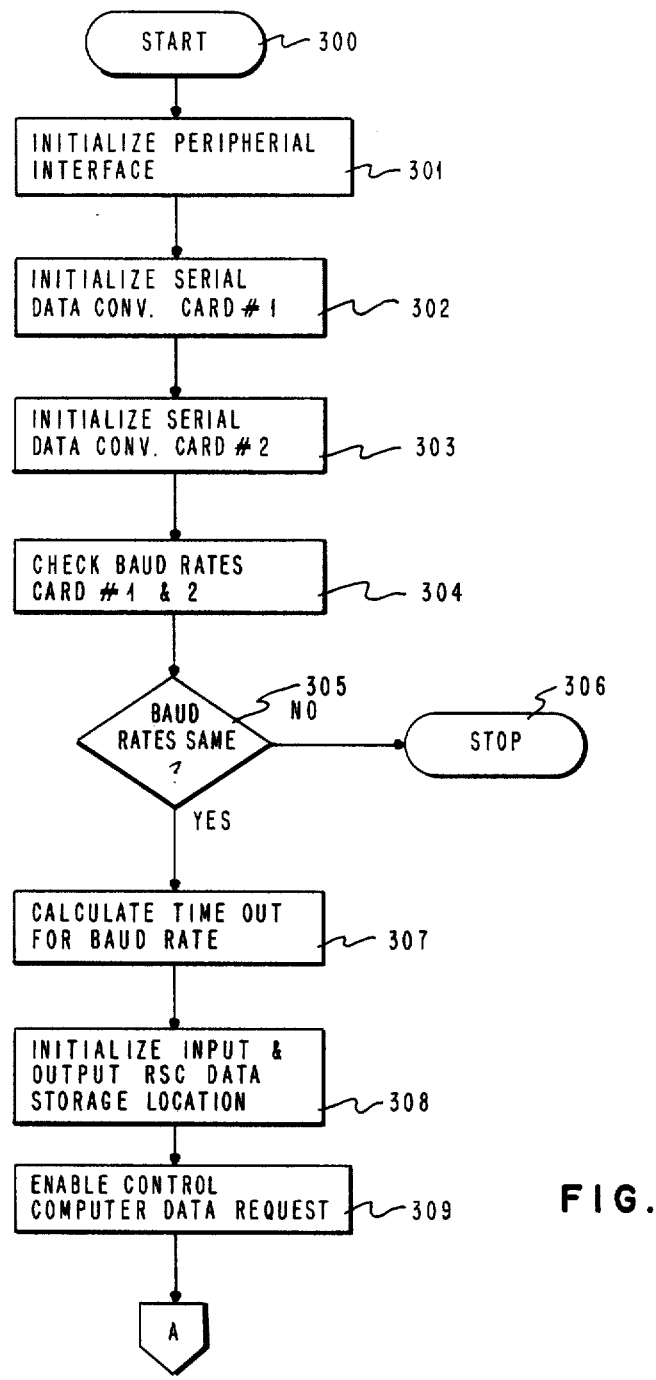
FIG. 5a–d is a flow diagram of the CIU Main Program.
Figure 5B:
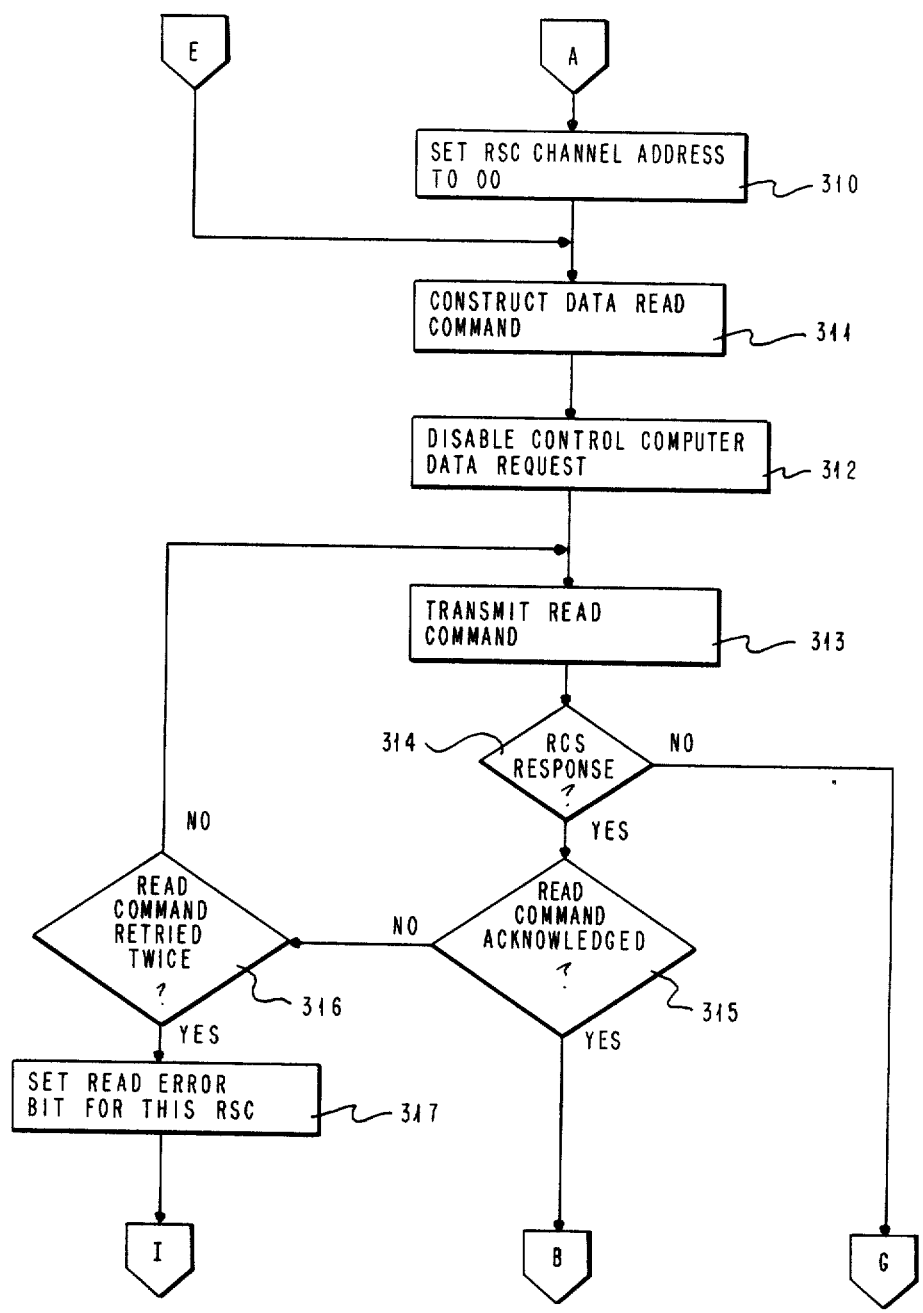
Figure 5C:
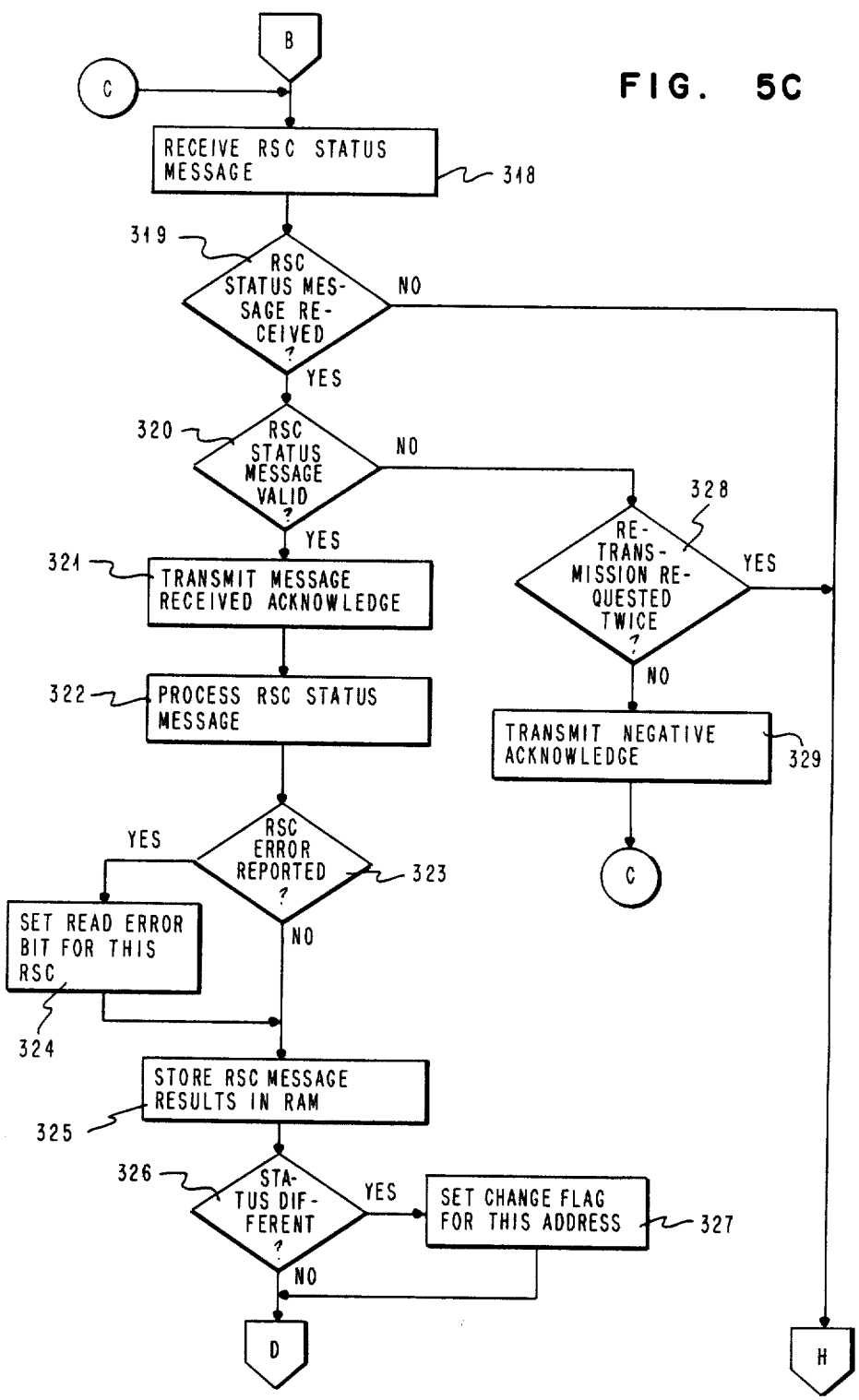
Figure 5D:
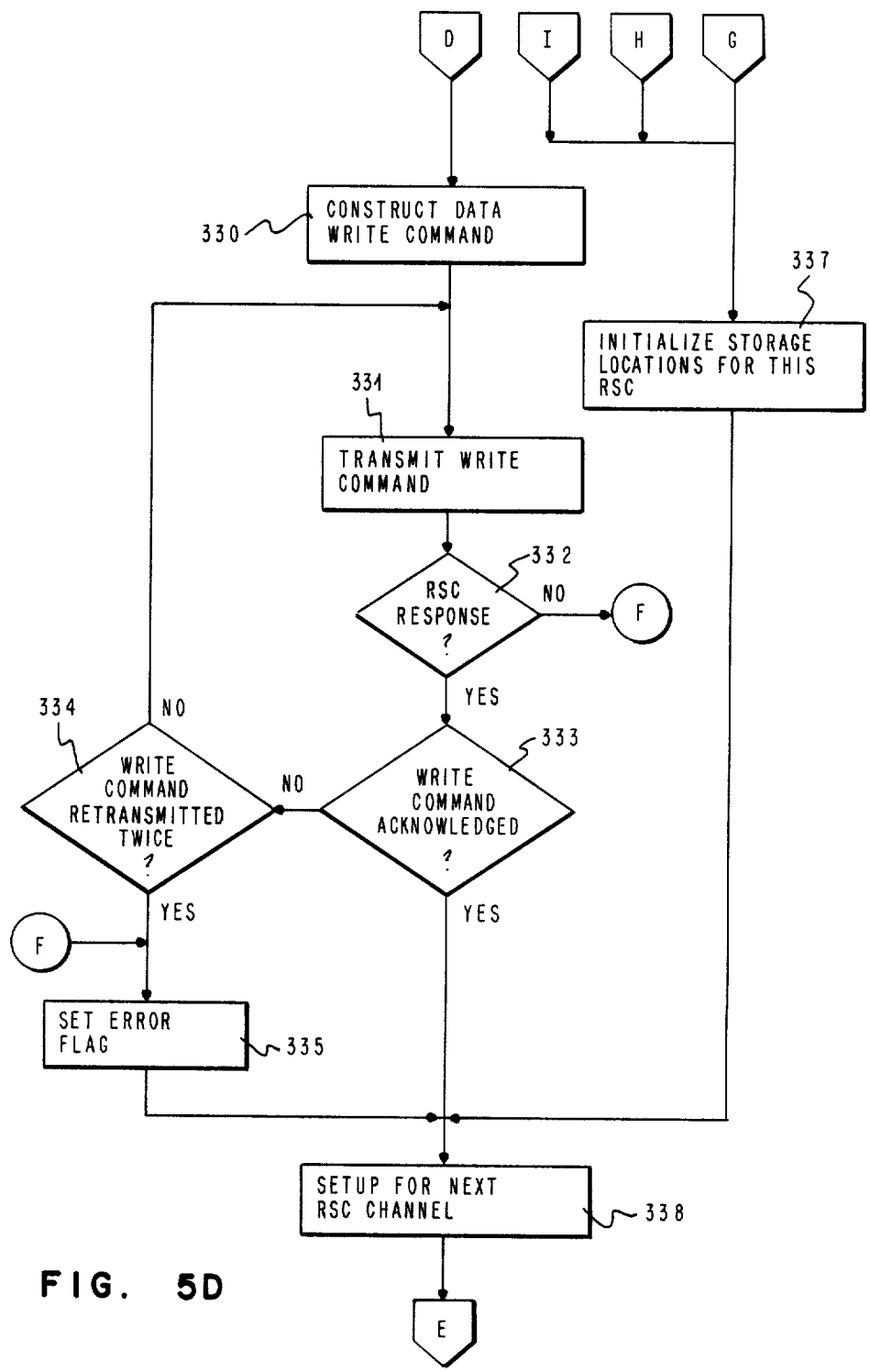

Refer now to FIG. 4, which is a block diagram of one of the 32 RSCs in the system. Each RSC includes a power supply (not shown). Processor 200 may be an 8 bit single chip processor and is driven by a crystal 204 for processing and storing data in memory internal to it. Software commands for driving the RSC are stored in another memory internal to processor 200.

Device 206, which may be an optical coupler receiver for receiving a signal from CIU 20, provides an input to processor 200 while processor 200 provides an output to output device 208, which may be an optical coupler transmitter. Serial to parallel and parallel to serial conversion may be implemented internal to processor 200 as is well understood by those skilled in the art.

Crystal 210 is provided for driving a baud rate generator 212 for generating communication rates to processor 200. The desired communication rate is jumper selectable, and the resulting rate is connected to the clock and timer inputs of processor 200 on lines 214 and 216 respectively. The signal on line 216 is used to measure the duration of the jumper selectable serial clock signal to enable processor 200 to determine the selected baud rate. Once the baud rate is determined, the communication timeout values may be calculated as below described for the desired communications rate. The technique just described of determining baud rate eliminates the need for three components conventionally used for this purpose. The technique used on and described in connection with CIU multiplexer cards 104, FIG. 3, is exemplary of conventional methods of determining baud rate, and requires three components—a rate select device 180, rate switches 182, and a switch status interface unit 160.

Data input to processor 200 is on bus 220 and is gated thereon from one of six tristate buffers 222, 224, 226, 228, 230 and 232. Processor 200 selects date through input select device 234. The first four tristate buffers 222, 224, 226 and 228 are used to read the status of external inputs that may typically be switches, relay contacts, TTL logic and the like. These four groups of eight bits are busses 223, 225, 227 and 229 respectively, are software partitioned into four addresses of eight bits each. The fifth tristate buffer 230 is used for auxiliary inputs on bus 231 as below described. The sixth tristate buffer 232 receives input from output latch 236 on bus 238 for providing a method of self test on the DI/DO buses.

Data output from data processor 200 is placed onto data out bus 240 and directed to one of four output latches 236, 244, 246 or 248. One of these latches is selected by processor 200 using output select device 250.

Latch 244 is connected to tristate buffer 230 via external connections for encoding a unique RSC box address and latch 244 drives a 'polling' light provided to display polling status described later. Latches 246 and 248 are used to control external output devices such as indicators or the like in the manufacturing work area through drivers 254 and 256.

The just described configuration supports four addresses with 8 inputs and 4 outputs each. The ability to perform self testing and address verification for insuring data integrity is an advantage of the present invention. This configuration further assures that outputs are not affected by erroneous commands from CIU 20 should a malfunction occur therein.

Refer now to FIGS. 5 and 6 for a better understanding of the software control for CIU 20. This software comprises 2 main sections; the main program CIUMP and the control computer service program CIUSP. CIUMP begins when the CIU 20 is powered up and runs continually, polling RSCs except when interrupted by control computer 2. When an interrupt occurs CIUSP services the interrupt and returns control of CIU 20 back to CIUMP.

Refer to FIG. 5. The CIU Main Program begins when the CIU is powered up by initializing the input and output devices at blocks 301-303 and then reading the communication Rate Switch status on each of the Serial Multiplex Cards at 304. The switch status settings are compared at step 305, and if they are different the program stops at terminal 306. If the communication rates are the same, processing continues by calculating the time out value for the selected communication rate and storing the calculated value at step 307. At block 308 data storage locations for the input and output data are initialized to the inactive state and any interrupt from control computer 2 is enabled at step 309 should an interrupt occur.

To begin polling the RSCs, RSC channel address is set to 00 at block 310. A Read Command is constructed at block 311 as shown in Table 1 for this RSC.

TABLE 1

READ COMMAND

[STX] [R] [ADDH] [ADDL] [NULL] [NULL] [NULL] [NULL] [CKSUM] [ETX]

| | |
|---|---|
| STX | Start of transmission |
| R | "Read" command. |
| ADDH | High bite of the RSC box address. |
| ADDL | Low bite of the RSC box address. |
| NULL | Four NULL characters are used to make the "Read" command the same length as the "Write" command. |
| CKSUM | Binary sum of the bits of all characters with the most significant bit forced high. |
| ETX | End of transmission. |

All command element characters are transmitted in seven bit ASCII except for the CKSUM which has its most significant bit high making the CKSUM character unique from all the others. Once the Read command is constructed, the control computer interrupt is disabled at block 312 and the command is transmitted to the RSC at step 313. If the RSC does not respond at decision block 314, the CIU assumes that no RSC exists on this channel address and prepares for the next RSC at steps 337 and 338.

If the RSC did respond to the Read command by transmitting a NAK character at block 315 up to two more retransmit attempts are made as indicated at step 316. If there is still no ACK response, an error flag is set for this RSC at block 317 and the program prepares for the next RSC at blocks 337 and 338. If there is an ACK response from the RSC, the CIU prepares to receive the status response from the RSC at 318. If the RSC response is not received timely as tested at block 319, the program prepares for the next RSC at blocks 337 and 338. If the RSC message is found not valid at test 320, i.e. the starting character, ending character and check sum do not match, retransmission of the RSC status message is twice requested by sending a NAK character to the RSC as shown at blocks 328 and 329. If by the third try the message is still not successfully received, control branches to setup for the next RSC at blocks 337 and 338. If the RSC message is valid, an ACK character is transmitted at block 321 to confirm receipt of the response.

The format of the RSC status message received in blocks 318-321 is shown in Table 2.

TABLE 2

RSC STATUS MESSAGE

[STX] [STATUS] [ADDH] [ADDL] [SW0H] [SW0L] [SW1H] [SW1L] [SW2H] [SW2L] [SW3H] [SW3L] [CKSUM] [ETX]

| | |
|---|---|
| STX | Start of transmission. |
| STATUS | Status byte to indicate errors or status normal. |
| ADDH | High bite of the RSC box address. |
| ADDL | Low bite of the RSC box address. |
| SW0H | High byte of the input status for RSC subaddress 0. |
| SW0L | Low byte of the input status for RSC subaddress 0. |
| SW1H | High byte of the input status for RSC subaddress 1. |
| SW1L | Low byte of the input status for RSC subaddress 1. |
| SW2H | High byte of the input status for RSC subaddress 2. |
| SW2L | Low byte of the input status for RSC subaddress 2. |
| SW3H | High byte of the input status for RSC subaddress 3. |
| SW3L | Low byte of the input status for RSC subaddress 3. |
| CKSUM | Binary sum of the bits of all characters with the most significant bit forced high. |
| ETX | End of transmission. |

Once the RSC status response is successfully received, the CIU processes the message at block 322 by checking the ADDH and ADDL to insure that the RSC address matches the selected channel and checking at step 323 the status byte for any system self test errors. If an error exists, the Read error bit is set at step 324 for this RSC. Next SW0H and SW0L through SW3H and SW3L are converted from ASCII to binary and stored at process block 325. If the new status is different than the information previously stored as indicated by compare step 326, a status change flag is set for this RSC subaddress at block 327.

To complete polling of this RSC, a Write command is constructed at step 330 to update the status of the RSC outputs. The format of the Write command is as shown in Table 3.

TABLE 3

WRITE COMMAND
[STX] [W] [ADDH] [ADDL] [OUT0] [OUT1] [OUT2] [OUT3] [CKSUM] [ETX]

| | |
|---|---|
| STX | Start of transmission. |
| W | Write command |
| ADDH | High bite of the RSC box address. |
| ADDL | Low bite of the RSC box address. |
| OUT0 | Output status information for RSC subaddress 0. |
| OUT1 | Output status information for RSC subaddress 1. |
| OUT2 | Output status information for RSC subaddress 2. |
| OUT3 | Output status information for RSC subaddress 3. |
| CKSUM | Binary sum of the bits of all characters with the most significant bit forced high. |
| ETX | End of transmission. |

Output status data for each RSC is stored in a RAM area in the CIU during interrupt servicing of the control computer as will be explained more fully below in connection with FIG. 6. After the Write command is transmitted at step 331, the program checks for a RSC response at block 332. If no response is found, the program sets a Write error flag at block 335 for this RSC and prepares for the next RSC at block 338. If a response is received and it is not an ACK character as shown by compare step 333, the CIU tries up to twice more to transmit at block 335. If that fails a Write error flag is set at block 334 and the program prepares as before for the next RSC. If the Write command is acknowledged by an ACK character at block 333, polling of this RSC is complete and the program prepares for the next RSC at block 338. The CIUMP continuously polls all of the RSC channels until an interrupt is received from the Controlling computer.

When an interrupt is received from the control computer, execution of CIUMP stops and the CIU Control Computer Service Program CIUSP begins (See FIG. 6). Once the CIUSP satisfies the control computer request, control of the CIU is returned to CIUMP and polling of the RSCs resumes.

As shown in FIG. 6, CIUSP begins processing a control computer interrupt at block 339 by reading at block 340 the command of the DI bus and determining the type of command by checking the command character received from the control computer in the tests indicated at blocks 341, 342, 343, 344, 345, 348 and 349. The commands are listed in Table 4 with a brief description of their function.

TABLE 4

CONTROL COMPUTER COMMANDS

| COMMAND CHARACTER | DESCRIPTION | FLOW CHART BLOCK NO. |
|---|---|---|
| A | Request all input data without data with error status. | 341 |
| B | Request for all input data that has changed without data with error status since the last A of B request. | 342 |
| C | Request input data for a single address | 343 |
| D | Request output and error status for a single address. | 344 |
| E | Request input data with error status. | 345 |
| F | Set an output bit high on a single address. | 348 |
| G | Set an output bit low on a single address. | 349 |

A or B commands, for All Input Data 341 or Changed Input Data 342, are received in a format wherein the command portion consists of a 7 bit ASCII code for the character A or B with the most significant bit, control computer bit 15 or CIU bit 7, used as a parity check bit. The least significant byte is not used for these two commands.

A type A or B command, causes a branch to a single routine. In addition, a Changed Data Flag is set at 346 for a type B command. This routine, FIG. 6C, begins by selecting an RSC address as shown at block 359 and reads the input data at block 360. The address selection technique referenced at block 359 determines the order that RSC status information is transmitted to control computer 2. This order is predetermined to group related vehicle moves in an area or flow to minimize transactions applicable to material handling systems containing such a vehicle. Forward and reversed Status Sequence Tables are provided to enable two differing sequences to be used, so that the vehicle can service moves while advancing from the process starting point to the ending point and service moves from the next type A or B command while it advances from the ending point back to the process starting point. If the Changed Data Flag is found at test set 361, an additional check is made on the changed data bit for the RSC address at block 367. If the data has not changed, CIUSP continues to the next RSC address.

If this is a type A command, or B command where the data is changed, the CIUSP checks the status for this address at block 362. If the error bit is set, this data is not transmitted to the control computer. An error code is sent at the end of the routine, at block 368, to inform the control computer that an RSC has an error.

If the status is normal, the routine proceeds to check, at test 363, the most significant input bit to determine if an RSC exists at this address and if this address is active. If so, the input data is transmitted to the control computer at block 364.

The routine then advances to the next selected RSC address in the Status Sequence Table at block 365. This process is repeated until all RSC addresses have been processed as indicated by test 366.

Once processing of the last RSC is completed, CIUSP transmits an end of data word at block 355, with a normal or error status code as appropriate, and returns to the CIUMP at block 351. Table 5 contains status code values.

TABLE 5

STATUS CODES

| | |
|---|---|
| FF | Normal end. |
| 00 | Parity error. |
| 01 | RSC self-test error. |
| 02 | Invalid control computer command. |
| 03 | CIU time out. |
| 04 | Invalid RSC address. |

Figure 6A:
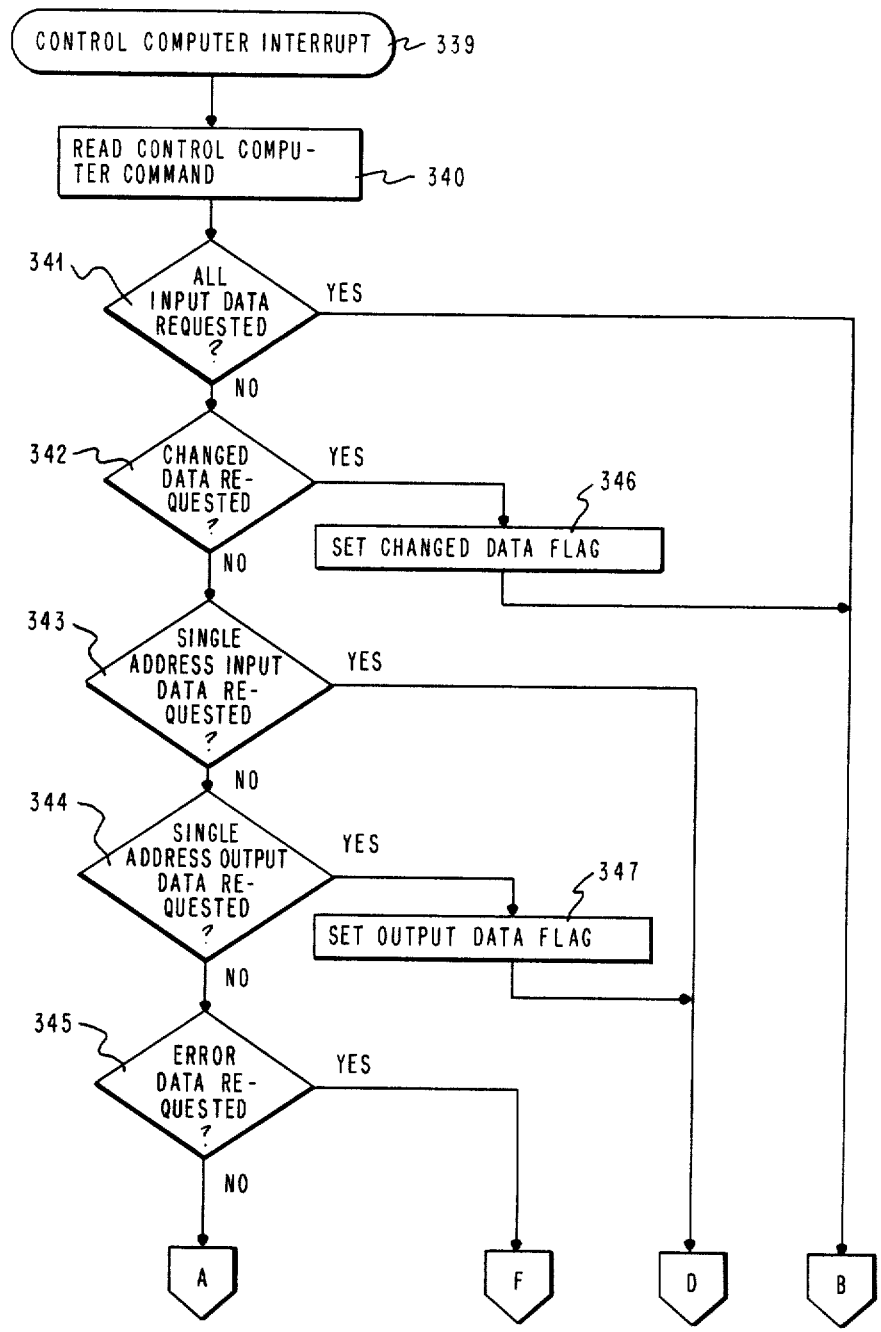
FIG. 6a–e is a flow diagram of the CIU Control Computer Service Program.

Returning to test blocks 343 and 344 FIG. 6a, command types C or D, for Single Address Input Data or Single Address Output Data, are received in the following data format. The command portion consists of a 7 bit ASCII code for the character C or D with the most significant bit, control computer bit 15 or CIU bit 7 used as a parity check bit. The least significant byte contains the specific RSC address for the requested data with the most significant bit used as a parity check bit.

To service either a type C or D command, the program branches to a single routine with an output data flag being set at block 347 for a type D command. This routine, shown in FIG. 6D, reads the desired RSC address at block 369 from the least significant byte transmitted by the control computer with the command character. CIUSP sets an index pointer at block 370 to the desired RSC address and checks the output data flag at test 371 to determine if input or output data is requested.

If the flag is not set, input data is read from RAM at block 372 and transmitted at step 373 to the control computer. If the output data flag is set, output data is read at step 374 and transmitted to the control computer at step 373.

To complete C or D command service, an end of data response is transmitted to the control computer at step 355 as above described and CIUSP returns control to the CIUMP at terminal 351.

E commands for Error Data, test block 345, are received in the same data format as A and B commands. The command portion consists of a 7 bit ASCII code for the character E with the most significant bit, control computer bit 15 or CIU bit 7, used as a parity check bit. The least significant byte is not used for this command.

Figure 6B:
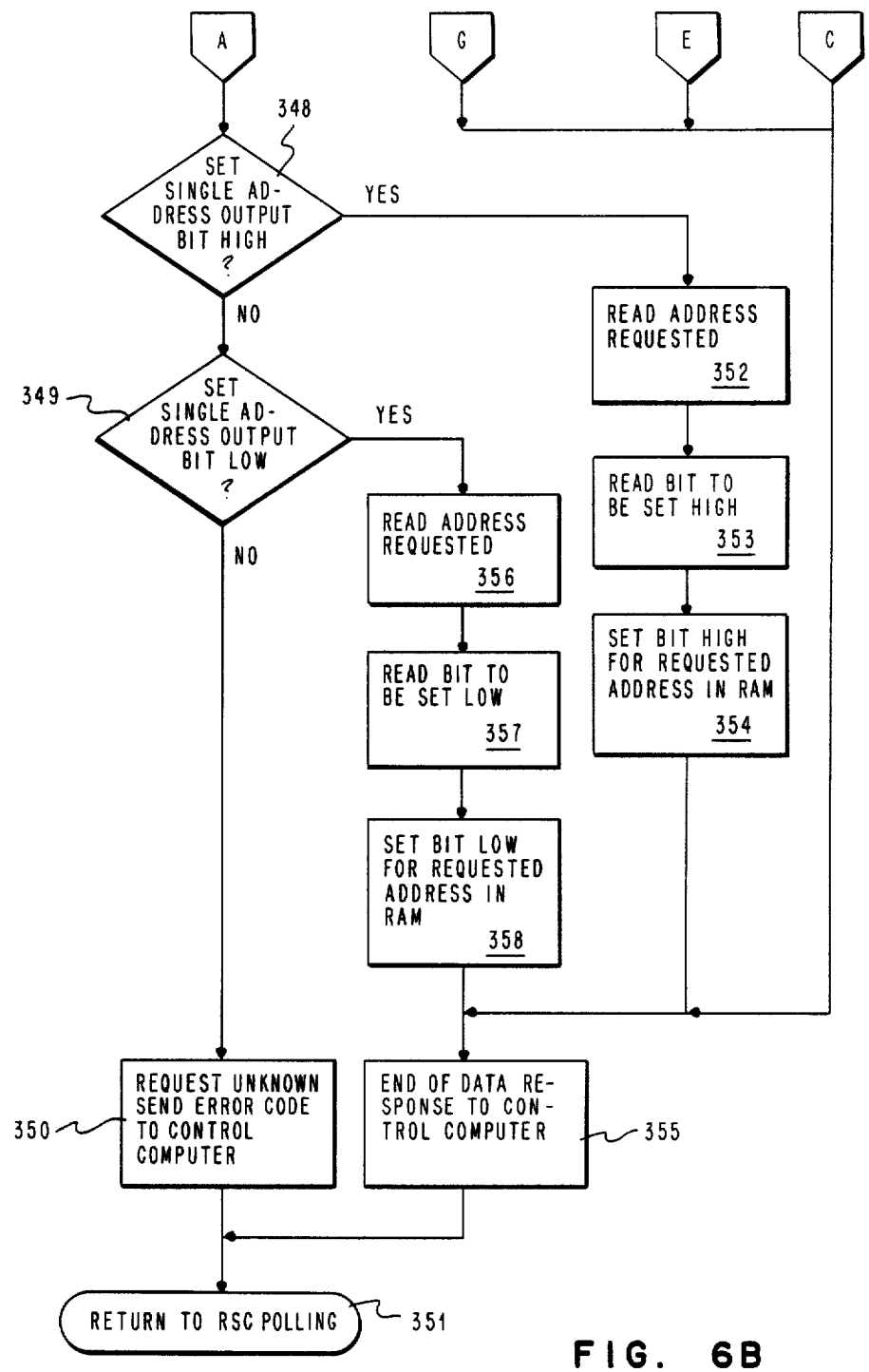
Figure 6C:
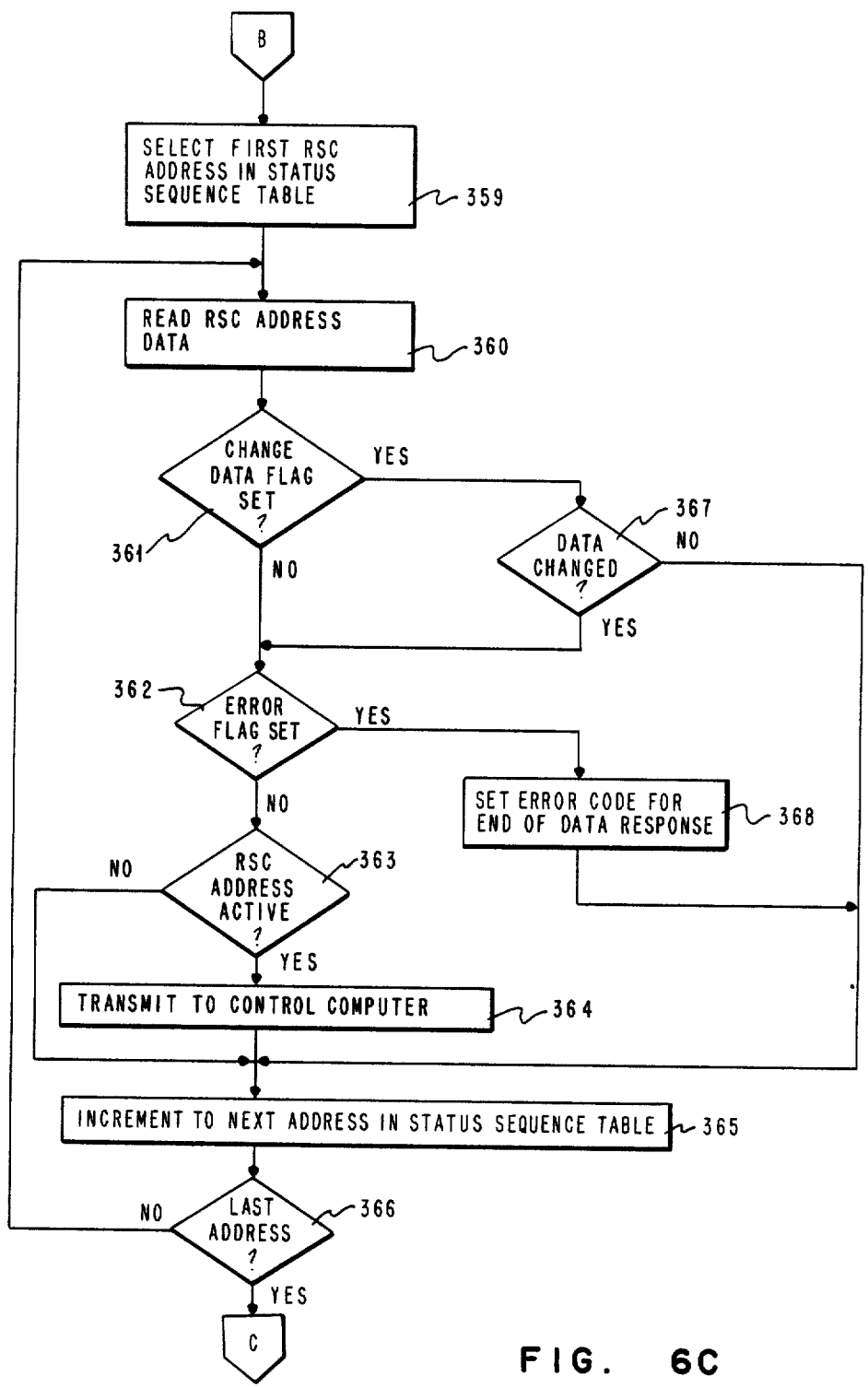
Figure 6D:
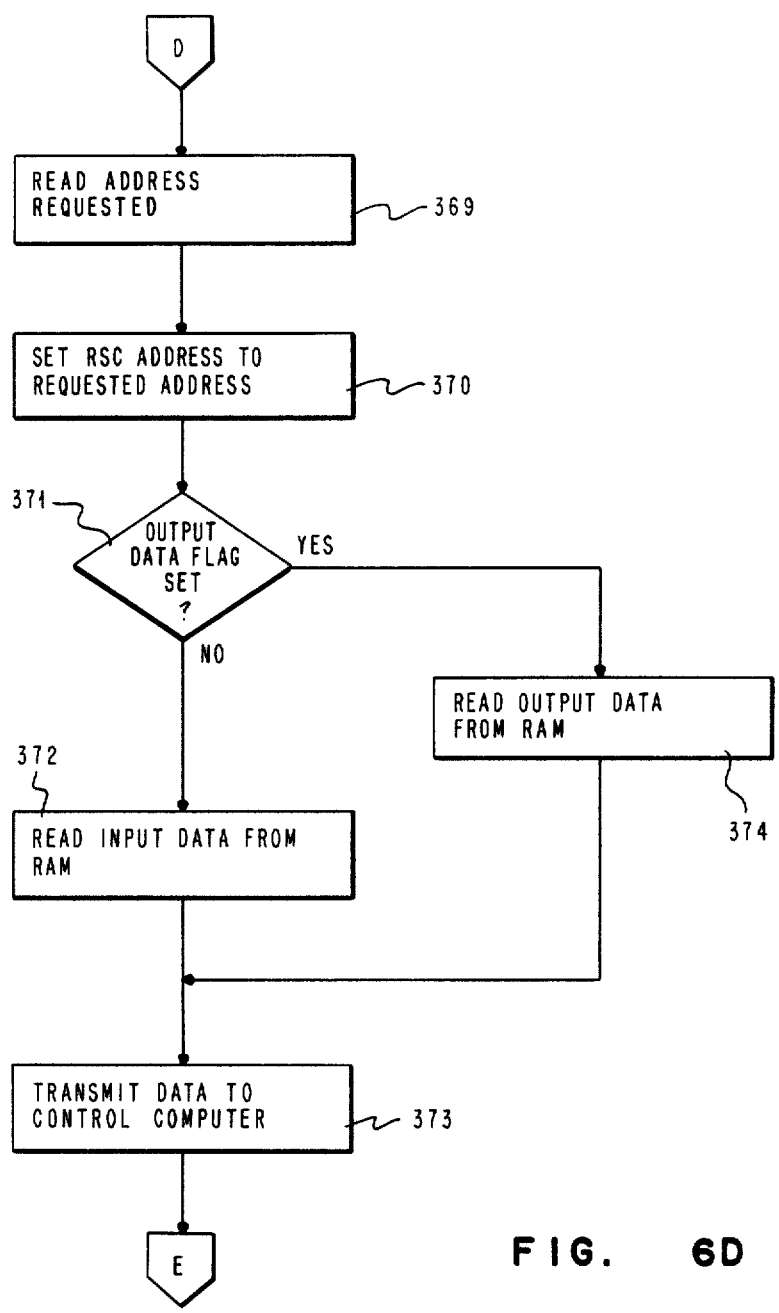
Figure 6E:
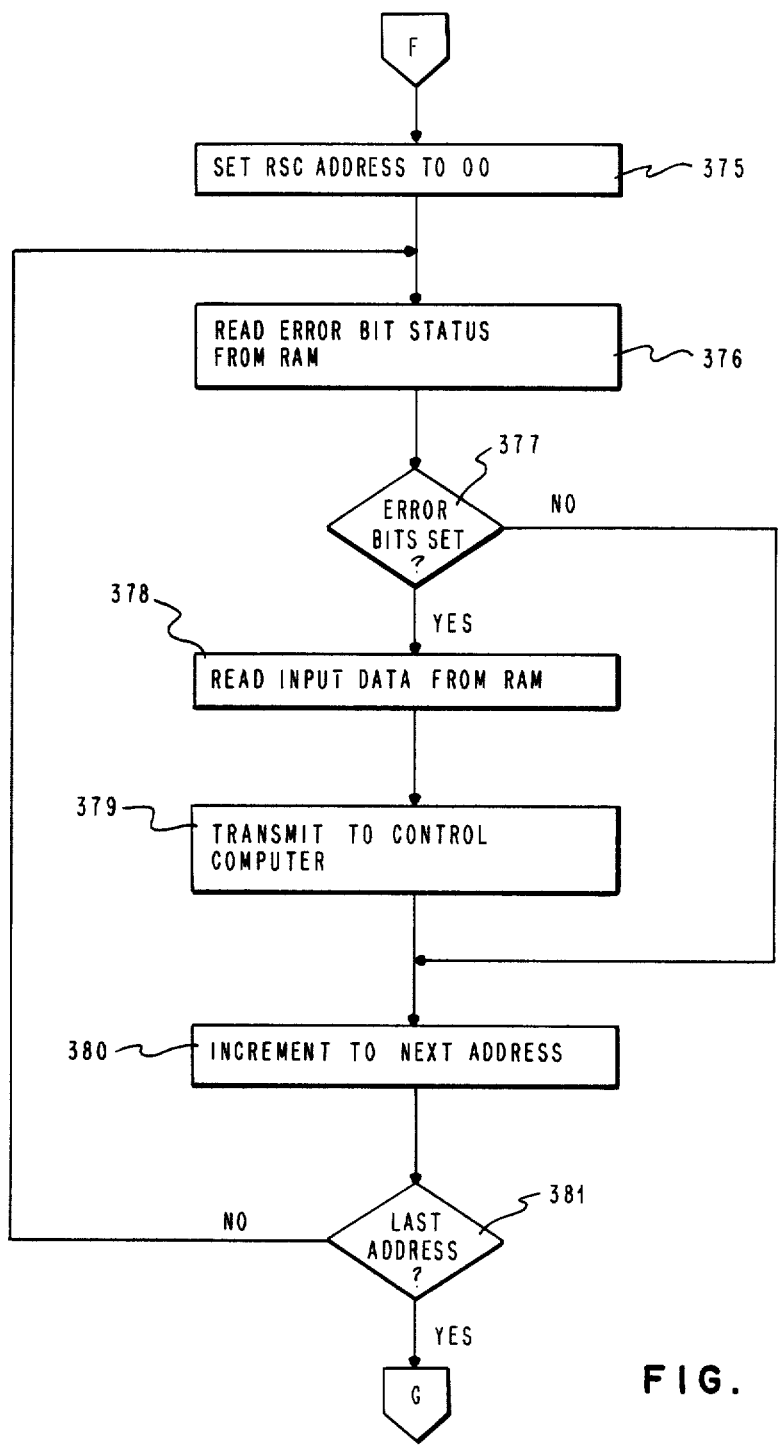

To service an E command, the program branches to an error service routine block 375, FIG. 6E, that begins at RSC address 00 and reads the status at block 376. The routine next checks status for this address at block 377. If the error bit is set, input data for this address is read from RAM at block 378 and transmitted to the control computer at block 379. If the error bit is found not set at test 377 or input data transmission is complete, the routine increments to the next address at block 380 and repeats the process until all the addresses as indicated at test 381 have been checked.

To complete E command service, an end of data response is transmitted to the control computer at block 355 and CIUSP returns control to the CIUMP at terminal 351.

F or G commands, as found at blocks 348 and 349, to Set Single Address Output Bit High or Set Single Address Output Bit Low, are received in the following data format. The command portion consists of a 7 bit ASCII code for the character F or G with the most significant bit control computer, bit 15 or CIU bit 7, used as a parity check bit. The least significant byte contains the specific RSC address for the requested output with the most significant bit used as a parity check bit.

To service an F command, the CIUSP reads at block 352, FIG. 6B, the desired address from the least significant byte of the first word transmitted from the control computer with the command. The bit desired to be set high is read at block 353 from the next word transmitted from the control computer. That bit is set high in memory at block 354.

Command F service is completed with transmission of an end of data response to the control computer at block 355, CIUSP returns control to the CIUMP as before at terminal 351.

To service a G command, CIUSP reads the desired address at block 356, FIG. 6B, from the least significant byte of the first word transmitted with the command character. The routine then reads at block 357 the bit desired to be set low from the next word transmitted from the control computer and sets that bit low at step 358.

To complete command G service, an end of data response is transmitted to the control computer at block 355 and control is returned to the CIUMP as heretofore described at steps 355 and 351.

Software associated with RSC processor 200 in FIG. 2 will be described in conjunction with the flow charts set out in FIGS. 7 and 8. The software which drives each RSC comprises two main sections; the main program RSCMP and the RSC CIU Service Program RSCSP. RSCMP begins when the RSC is powered up and runs continually, reading the status of the inputs to that RSC excepts when interrupted by CIU 20, FIG. 1. When an interrupt occurs, RSCSP services the interrupt and returns RSC control to RSCMP.

Figure 7A:
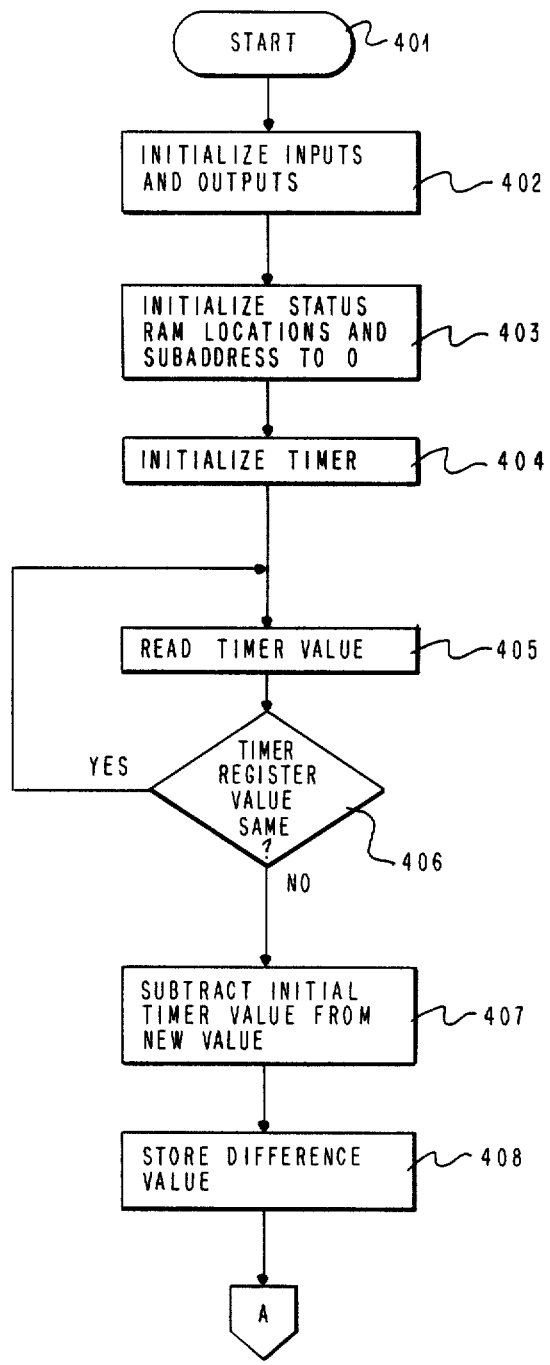
FIG. 7a–e is a flow diagram of the RSC Main Program.

Refer to FIG. 7A to better understand the RSCMP which begins when the RSC is powered up by initializing the inputs and outputs at blocks 401 and 402 and initializing status locations and setting subaddress to 0 at block 403. The program then determines the jumper selected baud rate set in hardware by initializing the timer in processor 200 which receives input on line 216, FIG. 4, at block 404 and reading at block 405 the timer value measuring elapsed time until a change in the value of a register is detected at test 406. At block 407 the new timer value is subtracted from the initial value and the difference is stored at step 408.

Figure 7B:
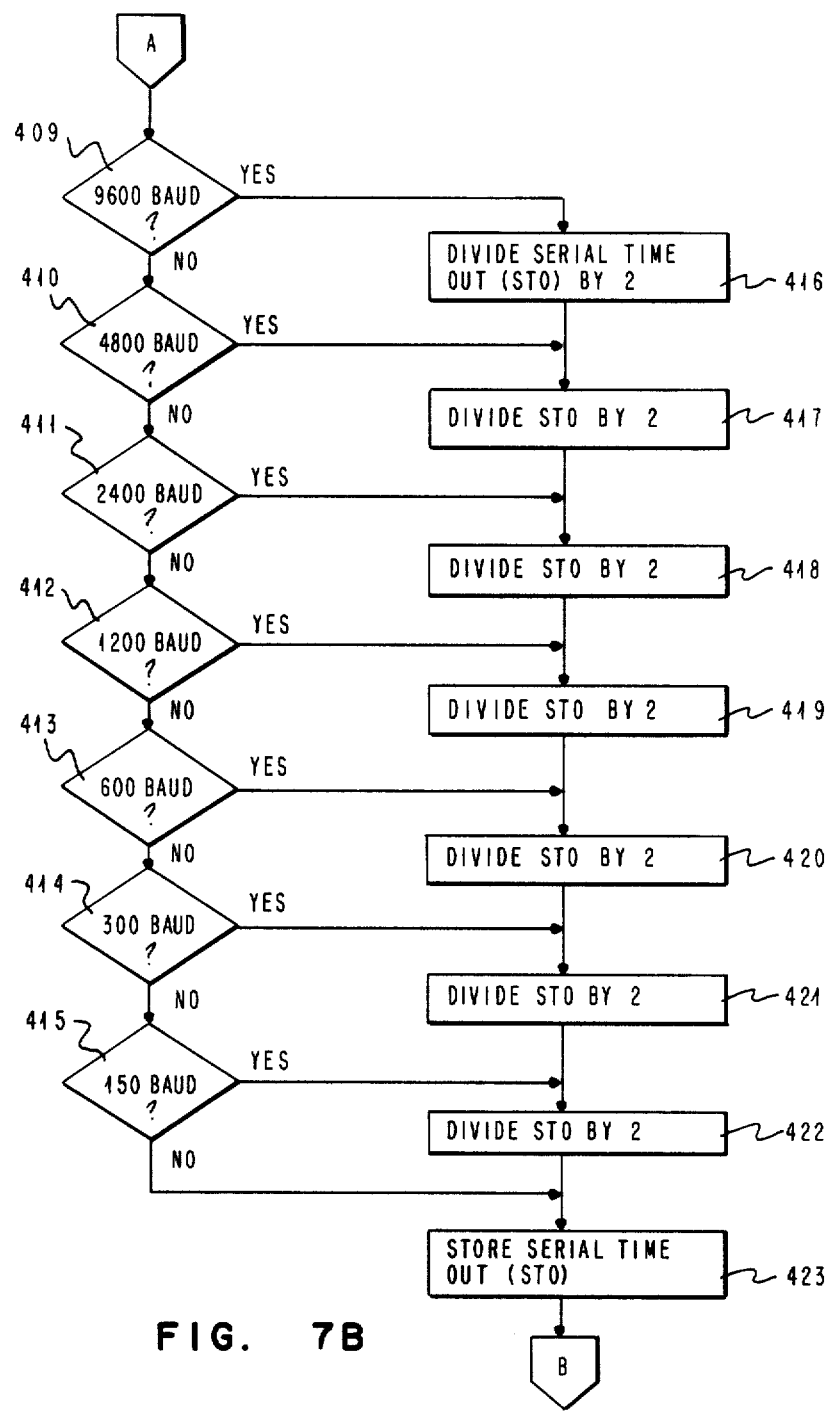

The difference value is known to be proportional to the baud rate setting. A set of values corresponding to baud rate resulting from calculations based on this proportionality is resident in processor memory. Thus, a series of comparisons of the elapsed time value and precalculated values at blocks 409, 410, 411, 412, 413, 414 and 415, FIG. 7B, are performed to determine the correct baud rate. Once determined, a serial time out value corresponding to 75 baud is divided by 2 at steps 416, 417, 418, 419, 420, 421 and 422 until a serial time out value corresponding to the correct baud rate is reached. The resulting value is stored at step 423 for use by RSCSP.

Figure 7C:
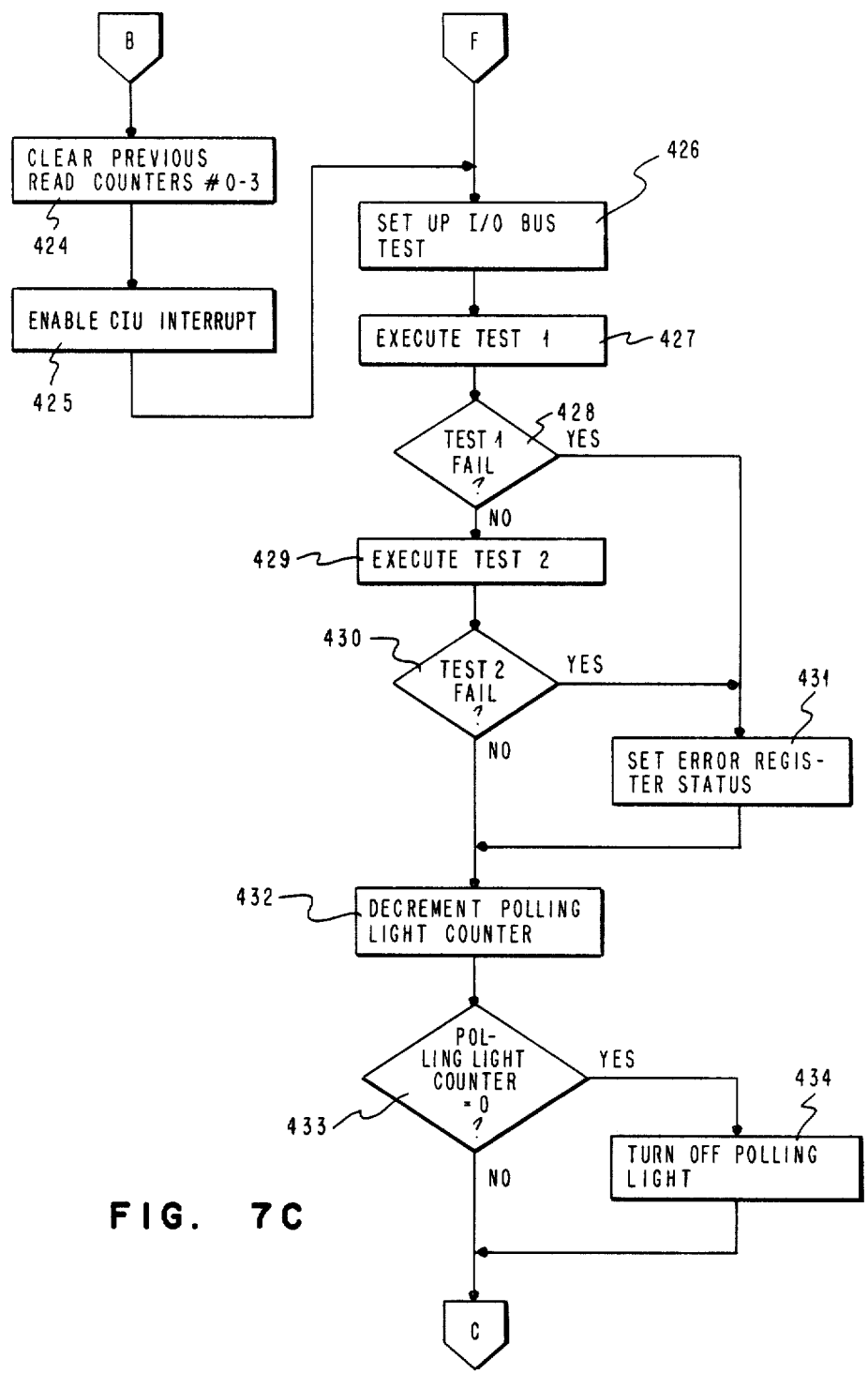

Previous read counters are cleared at step 424, FIG. 7C, and any CIU interrupt occurring is enabled at step 425.

RSCMP then conducts an I/O bus test by using the self test hardware described in connection with FIG. 4. The program selects the I/O bus test at step 426 so that a data word can be written out and read back on the input bus. The following hex data words may be in bus test #1 at block 427: 80, C0, E0, F0, F8, FC, FE, FF. If errors are found at test 428 an error status is set at step 431 and the bus test is stopped. If no errors are found, the following hex data words are used in bus test #2 at block 429: 7F, 3F, 1F, 0F, 07, 03, 01, 00. If errors are found at test 430, an error status is set as before. If no errors occur, the program continues by decrementing the polling light counter at block 432 and checking if the count equals zero at test 433. If the count has reached zero the program turns off the polling light at step 434 indicating that the CIU is no longer communicating with the RSC. The polling light counter is initialized in the RSCSP routine, explained more fully in connection with FIG. 8, that services the CIU interrupts.

The next portion of RSCMP reads input status and provides a software debounce to avoid incorrect data reads due to possible switch bounce or electrical noise problems. This is accomplished by checking 8 bits at a time for changes from the previous input status. This method works well in a factory floor environment where inputs change at a relatively slow rate, typical of movement in a material handling system. The 8 bit input status reads go through three stages to eventually be transmitted to CIU 20. The three stages are called the New Input Status, Previous Input Status, and finally Valid Input Status. New Input Status is the current read of the inputs. Previous Input Status is the previously read input data stored in RAM with a corresponding Previous Read Count to indicate the number of times the New Input Status has been the same as the Previous Input Status. Once the Previous Read Count has reached 0, the Previous Read Count is reinitialized and the New Input status is stored in the Valid Input Status location for possible transmission to the CIU.

Figure 7D:
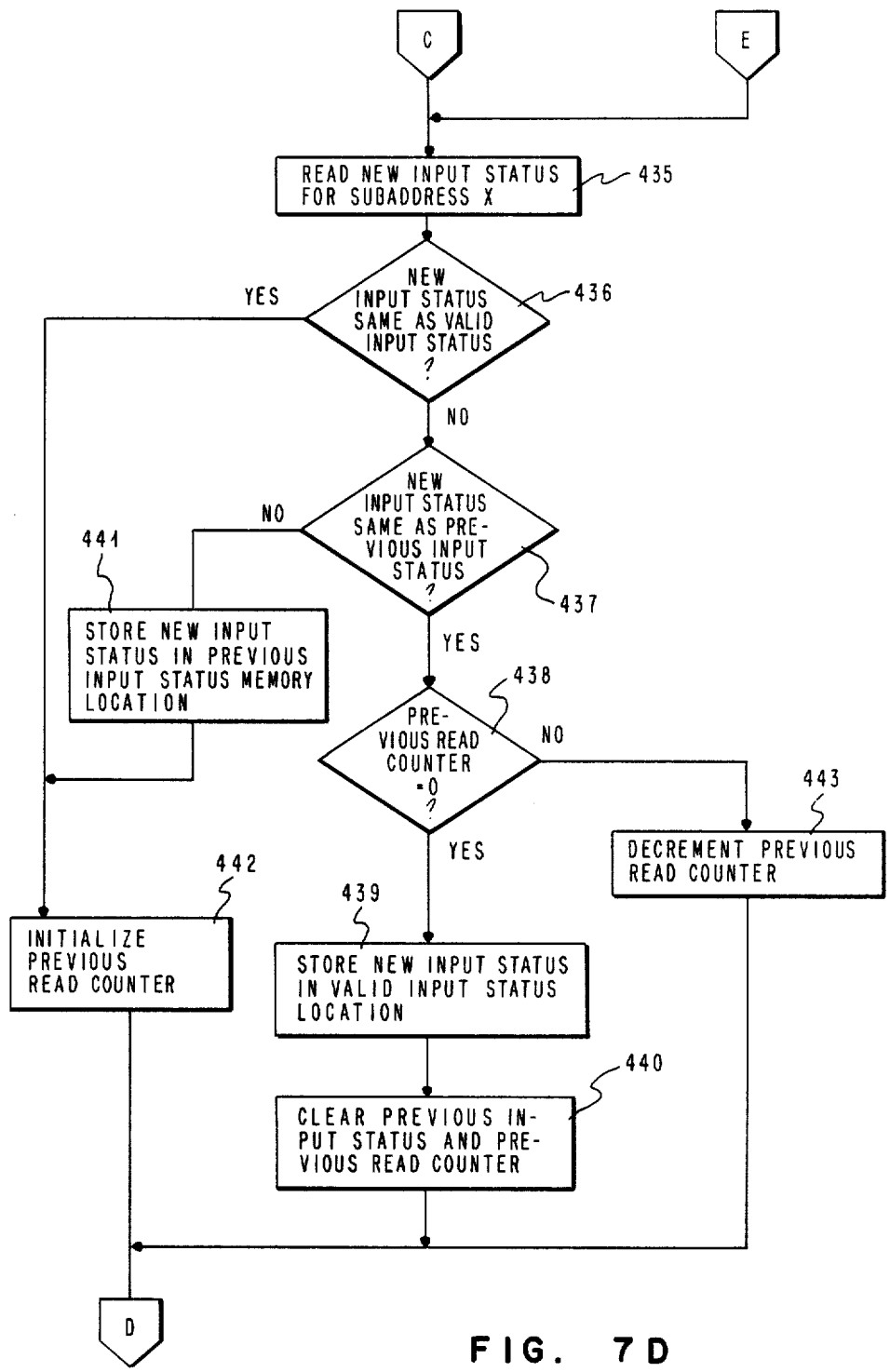
Figure 7E:
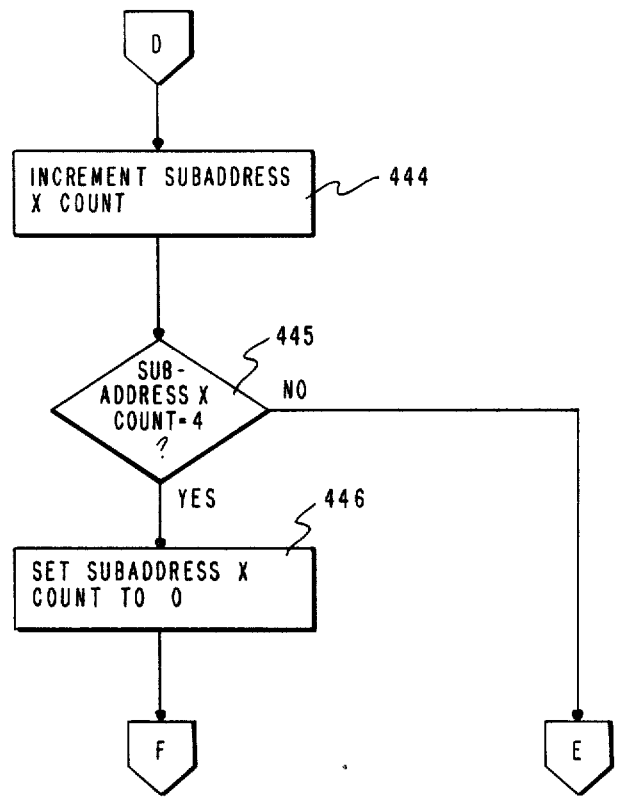

This process of input status is shown in FIG. 7D at blocks 435-443. New Input Status is read at test 435 from one of the four RSC subaddresses and compared to the Valid Input Status at block 436. If the status is the same, the Previous Read Count is reinitialized at 442 and the program increments to the next subaddress at step 444. If status is not the same, the new Input Status is compared to the Previous Input Status at step 437. If they are not the same, the New Input Status replaces the Previous Input Status at block 441 and Previous Read Counter is reinitialized at step 442.

If the New and Previous Input Status are the same and the Previous Read Counter is greater than zero at block 438, the Previous Read Counter is decremented at block 443 and the program increments to the next subaddress at step 444. If the Previous Read Count is equal to zero at block 438, the New Input Status (same as the Previous Input Status) replaces the Valid Input Status at block 439, and clears the Previous Input Status and the Previous Read Counter at block 440.

The RSCMP then increments to the next subaddress as before at block 444 and checks if all four subaddresses have been read at test block 445. If all subaddresses have been read, the subaddress is set to 0 at block 446. Else; the program repeats the bus test and input status reads for the next subaddress until all subaddresses have been read. The program repeats this process continuously until an interrupt is received from the CIU.

When an interrupt is received from the CIU, execution of RSCMP stops and RSCSP begins. Once RSCSP satisfies the CIU request, control of the RSC is returned to the RSCMP and polling of the inputs resumes. RSCSP will be better understood having reference to FIG. 8.

Figure 8A:
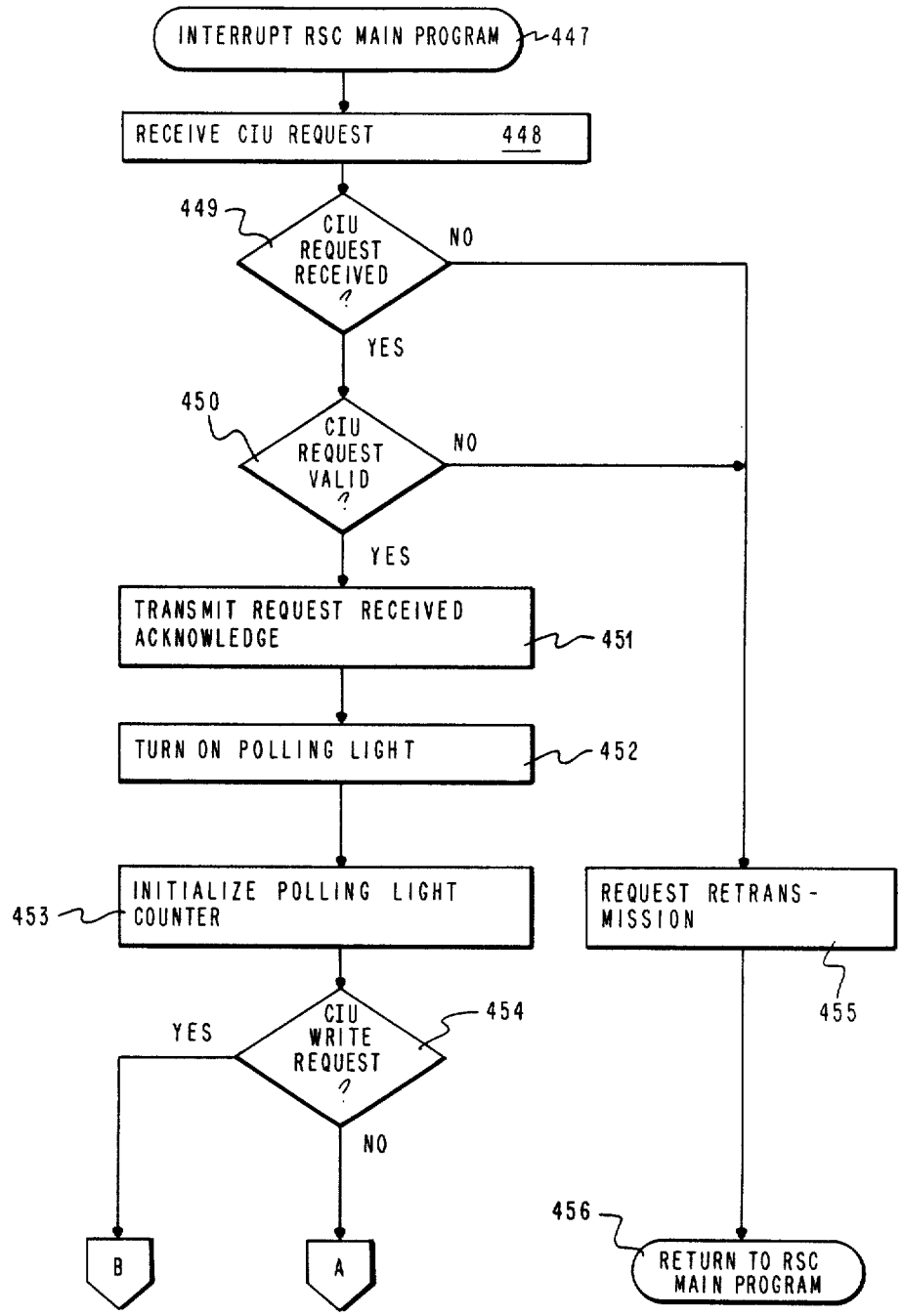
FIG. 8a–c is a flow diagram of the RSC CIU Service Program.
Figure 8B:
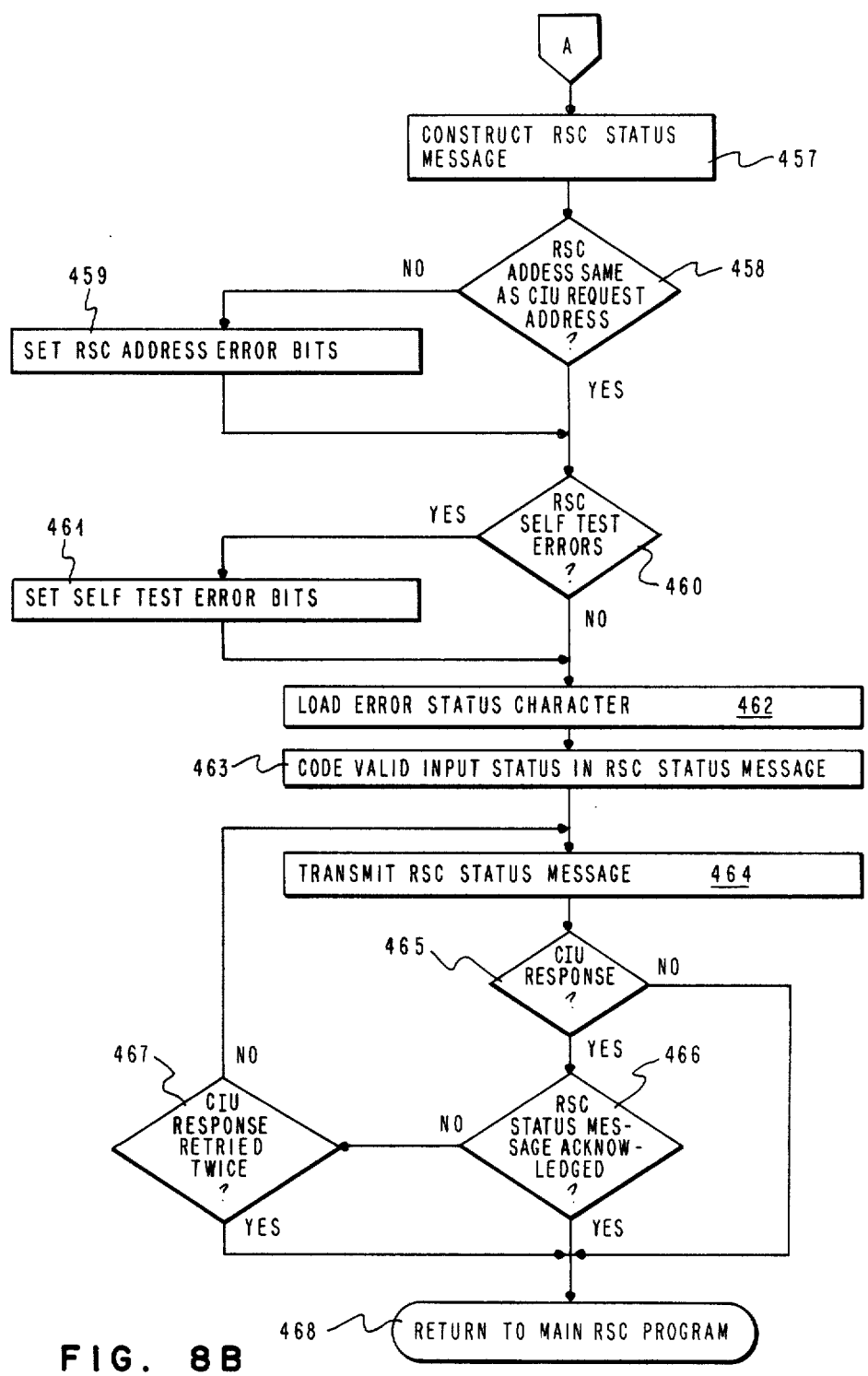

A request sent from the CIU to an RSC causes RSCMP to be interrupted at terminal 447, FIG. 8A. Execution of RSCSP begins by receiving the CIU request at block 448. The CIU request is either a Read command, Table 1 or a Write command, Table 3. If the complete CIU request is not received timely as indicated at block 449, or the request is not valid as determined at 450 i.e., the starting character, ending character and check sum do not match, the program requests a retransmission of the CIU request by sending a NAK character to the CIU, block 455 and returns control of the RSC to RSCMP at terminal 456. If the CIU request is valid, the program transmits an ACK character to the CIU at block 451 to confirm receipt of request. The RSCSP then at block 452 turns on the RSC polling light and initializes polling light counter at block 453. This counter is decremented by RSCMP as above described.

RSCSP then determines if the CIU request is a Read or Write command by checking at block 454. If the CIU request is a Read command RSCSP constructs a RSC status message at block 457, FIG. 8B. Refer back to Table 2. To determine the status character, at test block 458, a comparison is made between the RSC address on the Auxiliary Inputs and the address encoded in the CIU request. If they do not match an error bit is set at block 459. RSCSP then checks if any RSC self test errors occurred at step 460 and, if so, sets a self test error bit at block 461. The resulting status character is loaded at step 462 into the RSC status message.

Next, Valid Input Status values are included at step 463 into the message. The RSC status message is transmitted at block 464 to the CIU. If no CIU response is detected at test 465 or if the RSC receives an ACK character from the CIU, test 466, the program returns control of the RSC to RSCMP at terminal 468.

If the CIU did respond to the RSC status message by transmitting a NAK character, then the program retransmits up to two more times at block 467 before returning control of the RSC to the RSCMP.

Figure 8C:
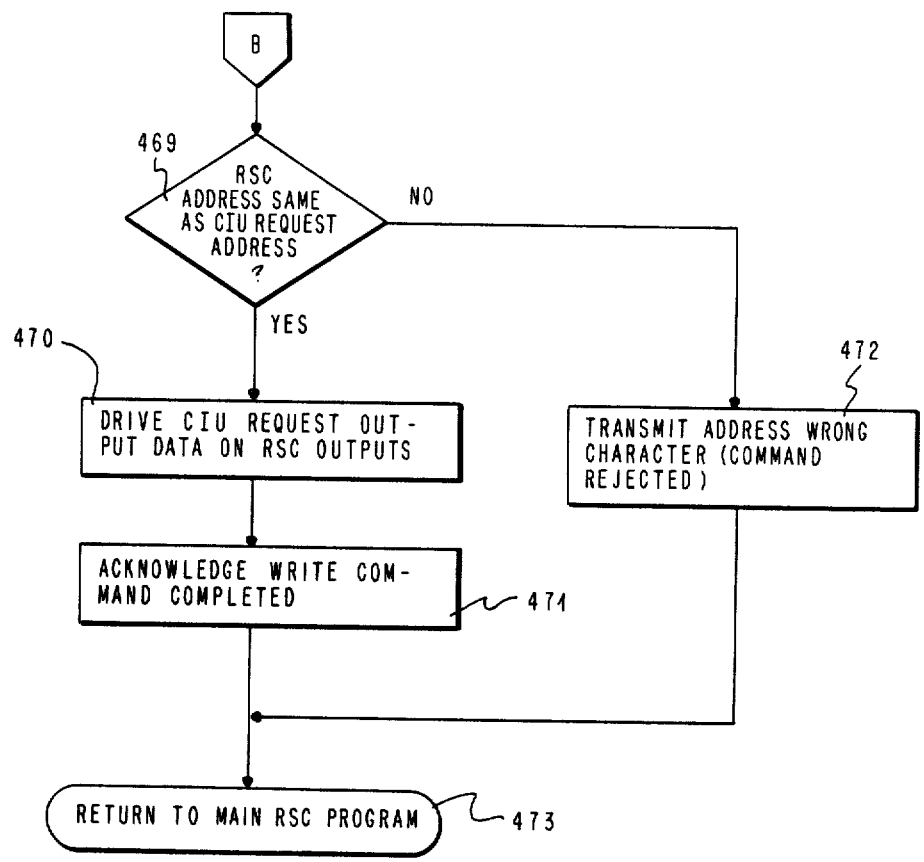

If the CIU request is found to be a Write command at test 454, the program compares the RSC address on the Auxiliary Inputs to the address encoded in the CIU request at step 469, FIG. 8C. If there is no match, an address wrong character is transmitted to the CIU at block 472, indicating that an error has occurred and the CIU Write request was rejected.

If the addresses do match, output data in the Write command received from the CIU is gated to the output latches 236, 244, 246 and 248 at step 470, in the RSC (FIG. 4). An RS character is transmitted at step 471 to the CIU to acknowledge that the Write command has been completed and control of the RSC is returned to the RSCMP at terminals 473.

UMS 10, FIG. 1, has been described to comprise two kinds of hardware, a CIU 20 and up to 32 RSCs 30,32 and 34. The CIU interfaces directly with the DI/Do lines of a factory environment control computer 2, and has up to 32 bidirectional serial data link connections, one to each RSC in the system. Each RSC includes its own power supply and I/O hardware. Functional electronics communicate with the CIU by a serial port with optical coupler buffer logic. The input and output signals are partitioned in four addresses of eight input and four output signals each, so that each input is directly compatible with a switch closure, TTl input, etc., and each output signal can directly drive other devices.

The combination of the RSC hardware and firmware accomplish input switch debouncing and continuous self testing. There is a hardware encoded unique RSC address and CIU channel address verification is provided. Error status is reported.

Each serial data link comprises a transmitter and receiver in each RSC and one of the 32 transmitters and receivers in the CIU. Cabling connecting each RSC to the CIU is preferably a four wire shielded cable. Data transmission may occur at hardware selectable rates varying from 75 to 9600 bps in eight steps. There is optical isolation between the CIU and plurality of RSCs. Data is ASCII encoded to include unique start and stop characters and a message check character. The transmitter is provided with a retry function on error determination and the receiver has a timeout function on error conditions.

In operation, UMS 10 of the present invention provides a CIU 20 for continuously polling all RSCs, recording their status and, upon demand from control computer to, transferring this information in a predetermined sequence to control computer 2. When the data transfer is complete, CIU 20 resumes polling and updating the status of the RSCs.

When control computer 2 requires information from CIU 20, a data transfer option is initiated by a set of commands, addresses and data. Each set of commands, addresses and data support a particular data command option.

Command A is a request for all data. Command B is similar to A except that only data changed from the last data transfer is required. Command C requires the input status of a particular address. Command D requires reporting the output status of the address in the request. Command E requests all self test errors and Commands F and G control the RSC outputs on the specified addresses to match the associated data.

When all requested information has been transmitted to control computer 2, CIU 20 sends an end of data response which includes system status information relating to normal end of data, any parity errors, self test error, invalid data transfer commands or timeout error, as shown previously in Table 5.

In order for any one of the serial communication links between the CIU and RSC to recover from communication errors, there must be a timeout wait after which the receiving device can resume normal operation. It is desirable that the length of the time out be associated with the selected communication rate.

In the present invention means is provided for measuring the duration fo the serial clock frequency as shown in FIG. 4. Only one signal need be monitored to determine the baud rate selected. A software routine, a flow chart of which is shown in FIG. 7A, measures the duration of the clock signal.

While the invention has been described in reference to a particular, preferred embodiment, it will be understood by those skilled in the art that changes in form and detail may be made without departing from the scope thereof.

What is claimed is:

1. A control system for a high volume manufacturing installation including:
    a control computer;
    a plurality of workstations;
    a material handling system in communication with said control computer and said workstations;
    a plurality of station controllers, in communication with said workstations, for monitoring and storing status of I/O lines associated with said workstations;
    a control interface unit in communication with said control computer and said plurality of station controllers for continuously polling said station controllers for obtaining and buffering status data about said workstations;
    means in said control interface unit for transferring said status data to said control computer on demand therefrom, in a sequence predetermined as a function of relative position of each of said plurality of workstations,
    means in said control computer responsive to said status data for instructing said material handling system in real time for defining a movement path among said plurality of workstations for servicing same.

2. The apparatus of claim 1 wherein the control interface unit additionally includes:
    random access means for storing status data; and
    table lookup means for retrieving the stored status data in the predetermined sequence.

3. The apparatus of claims 1 or 2 wherein the plurality of station controllers each includes:
    means for determining data transmission rate as a function of the duration of an input clock signal.

4. An improved method for directing movement of an unmanned vehicle to a workstation along an optimized path in a multi-workstation computer controlled manufacturing environment comprising:
    continuously polling station controllers associated with said workstations for obtaining I/O line status information about said workstations;
    transferring said status data to a control computer upon demand therefrom in a sequence determined as a function of the relative location of the workstations; and
    utilizing said status information for defining a movement path for said unmanned vehicle among said workstations.

* * * * *